United States Patent [19]

Krips et al.

[11] Patent Number: 4,727,635
[45] Date of Patent: Mar. 1, 1988

[54] METHOD OF SECURING TUBES BETWEEN TUBE SHEETS

[75] Inventors: Herbert Krips, Bochum; Miroslan Podhorsky, Ratingen, both of Fed. Rep. of Germany

[73] Assignee: Balcke-Dürr Aktiengesellschaft, Ratingen, Fed. Rep. of Germany

[21] Appl. No.: 42,410

[22] Filed: Apr. 24, 1987

[30] Foreign Application Priority Data

Apr. 26, 1986 [DE] Fed. Rep. of Germany ....... 3614237

[51] Int. Cl.$^4$ .............................................. B23P 17/00
[52] U.S. Cl. ................................... 29/157.3 C; 29/523
[58] Field of Search ................... 29/157.3 C, 521, 523, 29/726, DIG. 48

[56] References Cited

U.S. PATENT DOCUMENTS 4,449,280 5/1984 Schroeder .................. 29/157.3 C X
4,547,944 10/1985 Hayden ....................... 29/157.3 C X

FOREIGN PATENT DOCUMENTS 908819 3/1954 Fed. Rep. of Germany .
9774 5/1955 German Democratic Rep. .

Primary Examiner—Timothy V. Eley
Attorney, Agent, or Firm—Becker & Becker, Inc.

[57] ABSTRACT

A method of securing tubes between tube sheets of a heat exchanger, with the tube sheets being interconnected via a housing. The tubes and/or the tube sheets of are made of a steel that has to be annealed after a welding process. To be able to provide a stress-free connection between the tubes and the tube sheets, and to enable simple repair of the tubes, the length of at least one end of each tube is extended by welding thereto a tubular piece that is made of a material that can be welded without subsequent thermal treatment being required. Sleeves that extend the length of the holes in the tube sheet are welded onto the outer surface of at least one of the tube sheets. At least the free end of each sleeve is made of a material that can be welded without subsequent thermal treatment being required. One end of each tube, if such end is not provided with a tubular extension, is welded onto a tube sheet. A final thermal treatment is carried out after all welding steps that require a subsequent thermal treatment are concluded. The tubes are indirectly connected to those tube sheets that are provided with sleeves by welding the free ends of the tubular extensions of the tubes to the sleeves.

3 Claims, 2 Drawing Figures

METHOD OF SECURING TUBES BETWEEN TUBE SHEETS

BACKGROUND OF THE INVENTION

The present invention relates to a method of securing tubes between tube sheets of a heat exchanger, with the tube sheets being interconnected via a preferably rigid housing. The tubes and/or the tube sheets are made of a steel that has to be annealed, for stress-relieving purposes, after a welding process.

With this type of thermal treatment of heat exchangers having tubes extending between two tube sheets, locally varying temperatures cannot be avoided, so that no matter how carefully the thermal treatment is carried out, stresses remain in the heat exchanger. These stresses affect particularly adversely the large number of weld seams that are provided between the tubes and the tube sheets, and that separate the media that is to be heated up and cooled off in the heat exchanger. Furthermore, it is complicated, time consuming, and expensive to repair the heretofore known constructions.

Up to now, to secure the tubes between tube sheets of heat exchangers, the ends of the tubes were generally welded directly to the tube sheets. As a results, it was necessary, due to the material of the tubes and/or of the tube sheets, which had to be annealed after a welding process, to subject the heat exchanger to a subsequent thermal treatment, at least in the region of the weld seams, so that local stress and hardening from the welding can be removed.

It is furthermore known to provide the outer surface of tube sheets used to produce heat exchangers with a plating. In this case also the weld seams between the tubes and the plating must be subsequently thermally treated if the tubes are to made of a steel that has to be thermally treated after a welding process to remove local stress and hardening. In the last-mentioned case, it is possible in the event of repair to close-off one or more of the tubes by placing into the plating a plug that is made of the plating material or of a material that is equivalent thereto. Since this plug is welded solely to the plating, no subsequent thermal treatment is required in this repair situation. However, the tubes that are closed-off by a plug no longer take part in the heat exchange.

It is an object of the present invention to provide a method of securing tubes between tube sheets of heat exchangers, whereby it is possible to have a stress-free connection between the tubes and the tube sheets, and a simple repair, even if the tubes and/or the tube sheets are made of a steel that must be annealed after a welding process.

BRIEF DESCRIPTION OF THE DRAWING

This object, and other objects and advantages of the present invention, will appear more clearly from the following specification in conjunction with the accompanying schematic drawing that explains the inventive method, and in which.

SUMMARY OF THE INVENTION

Figure 1:
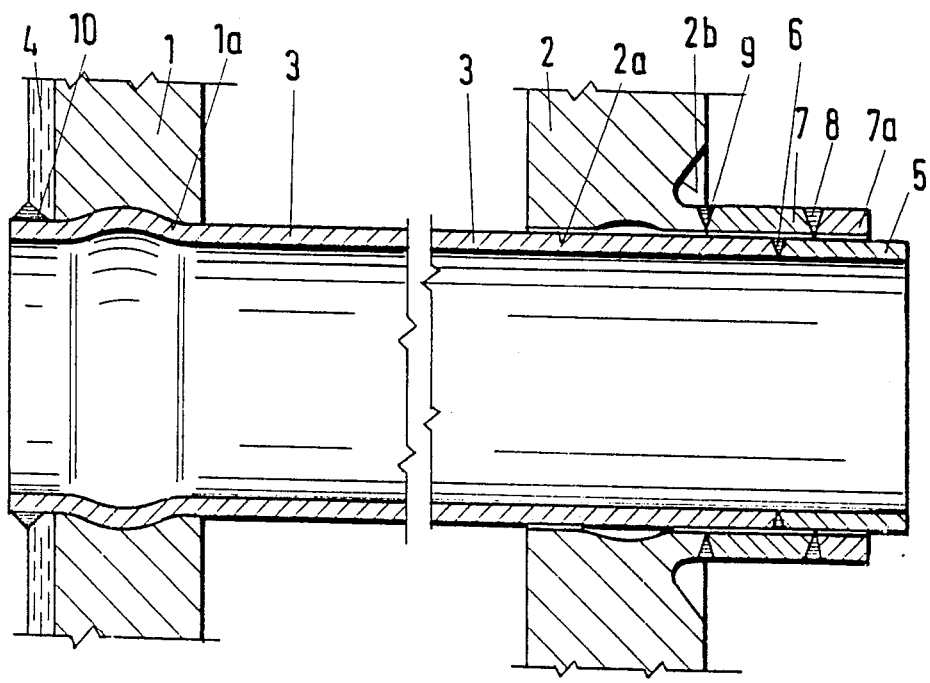
FIG. 1 is a cross-sectional view through a tube, which is to be secured between two tube sheets pursuant to the inventive method, prior to carrying out the actual securing process itself, but after preparatory steps have been carried out.

The method of the present invention is characterized by the steps of: extending the length of at least one end of each tube by welding thereto a tubular piece that is made of a material that can be welded without subsequent thermal treatment being required; welding onto the outer surface of at least of the tube sheets (i.e. onto that surface thereof facing away from the other tube sheet) sleeves that respectively extend the length of the tube-receiving holes in that tube sheet, with at least the free (i.e. non-welded) end of each such sleeve being made of a material that can be welded without subsequent thermal treatment being required; inserting the tubes into the holes of the tube sheets; welding onto one of the tube sheets one end of each tube if this tube end is not provided with a tubular extension, with a tube sheet that is provided with sleeves remaining non-welded to the tubes; carrying out a final thermal treatment after all welding steps that require a subsequent thermal treatment are concluded; and indirectly connecting the tubes to those tube sheets provided with said sleeves by welding the free ends of the tubular pieces of the tubes to the sleeves.

By welding the tubes and the tube sheets exclusively via the free ends of the tubular extensions and of the sleeves, the material of both of which requires no subsequent thermal treatment, the necessity is eliminated of having to subject the heat exchanger once again to thermal treatment after the two ends of the tubes have been fixed in the tube sheets; such a subsequent thermal treatment would lead to uncontrollable and unavoidable stresses. The previously carried out thermal treatment of the weld seams between the tubes and the tubular extensions on the one hand, and between the sleeves and the tube sheets on the other hand, can be carried out individually or together in conjunction with the thermal treatment of the entire heat exchanger. In the last-mentioned instance, at most one end of each tube is secured to the pertaining tube sheet, so that the other end of each tube can expand freely in its hole in the other tube sheet during the thermal treatment. This prevents the occurrence of uncontrolled stresses.

The weld seams that are to be provided pursuant to the inventive method at the tubes, tubular extensions, and sleeves can be checked completely and are disposed in a zone that is free of stresses that can originate from operation of the heat exchanger. Thus, no damage is anticipated to the weld seams during operation. However, should damage occur to one or more of the tubes, this can be taken care of by repair work carried out pursuant to the inventive method, or by replacing individual tubes. In either case, this can be undertaken on location and without the necessity for a subsequent thermal treatment. Furthermore, all weld seams that have to be made during such repair work can be completely checked.

Pursuant to one preferred specific embodiment of the inventive method, the tubes are hydraulically expanded in a known manner to secure them in position in the tube sheets. In so doing, a hydraulic expansion also takes place in the region of the tubular extensions and the sleeves. In this way, any gap that existed between the tubular extensions and the sleeves is closed-off, so that even where a leak or bad seal exists, no medium can enter between the tubular extensions and the sleeves. This prevents damages and leaks from occurring in this region during operation of the heat exchanger.

Further specific features of the present invention will be described in detail subsequently.

DESCRIPTION OF PREFERRED EMBODIMENTS

Figure 2:
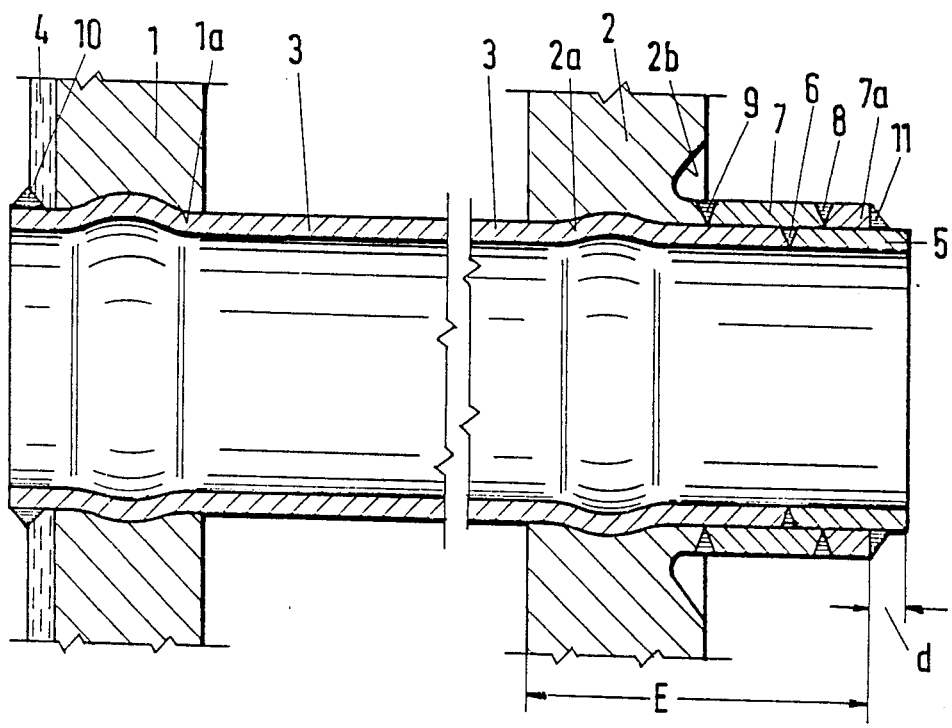
FIG. 2 is a cross-sectional view similar that of FIG. 1 after conclusion of the inventive method.

Referring now to the drawing in detail, portions only of two tube sheets 1 and 2 are illustrated. The tube sheets 1, 2 are provided with bores or holes 1a and 2a in which are secured the ends of straight tubes 3. One such tube 3, and portions of the pertaining tube sheets 1 and 2, are illustrated in FIGS. 1 and 2. Viewed as a whole, the tube sheets 1 and 2, along with the tubes 3, form the principal part of a heat exchanger.

Such a heat exchanger serves to heat up or cool off a medium that either flows through the tubes 3 or flows around the outside of the tubes 3. The heat transfer thus takes place through the walls of the tubes 3. For this purpose, the bundle of tubes 3 that extends between the tube sheets 1 and 2 is surrounded by a non-illustrated casing or housing that interconnects the tube sheets 1 and 2.

In the illustrated embodiment, not only the tube sheets 1 and 2 but also the tubes 3 are made of a steel that must be annealed after a welding process in order to remove local stress and hardening produced by the welding. The outer surface of the tube sheet 1 is provided with a plating 4 that is made of a material, such as a high-grade steel, which can be welded without a subsequent thermal treatment. Despite this property of the material of the plating 4, it is necessary to carry out a thermal treatment if the ends of the tube 3 are to be welded to the plating 4 because the stress and hardening in the tube 3 must be removed by such a thermal treatment.

In the embodiment illustrated in FIGS. 1 and 2, the tube sheet 1 is first provided with the plating 4. Subsequently, both of the tube sheets 1 and 2 are drilled in order to provide the aligned holes 1a and 2a for the later insertion of the tubes 3. The drilled tube sheets 1 and 2 are then provided with the non-illustrated housing, and in this manner are more or less rigidly interconnected.

A tubular extension 5 is now welded to each of the tubes 3. Just like the plating 4, this tubular extension 5 is made of a material that can be welded without thermal treatment. The weld seam 6 thus constructed is subsequently checked.

Sleeves 7 are now produced, the inside diameters of which are slightly greater than the outer diameters of the tubes 3 that are provided with the tubular extensions 5. On the whole, these sleeves 7 can be made of a material that can be welded without thermal treatment. In the illustrated embodiment, however, these sleeves 7 are also made of a steel that must be thermally treated after welding. In this case, an extension 7a is welded to the sleeve 7; the extension 7a is made of a material that can be welded without thermal treatment. The weld seam 8 is also checked after it is made.

After this preparation of both the tubes 3 and the sleeves 7, the latter are now welded to the outer surface of the tube sheet 2, which has previously been provided with recesses 2b. In this case also the resulting weld seam 9 is checked before the tubes 3 are subsequently placed in the holes 1a and 2a of the tube sheets 1 and 2.

In the illustrated embodiment, the securing of one end of each of the tubes 3 in the tube sheet 1 is not effected via hydraulic expansion. In order to fix the mounting of the tubes 3 in the tube sheet 1, the latter is provided in the vicinity of each hole 1a with respective rounded-off recesses, as can be seen from the drawing. After the hydraulic expansion of the tube ends within the tube plate 1, a welding of this tube end to the plating 4 is finally effected. Here also the resulting weld seam 10 is subsequently checked.

Since all of the weld seams 6, 8, 9, and 10 produced up to now are at least partially associated with a material that has to be annealed after a welding process, a thermal treatment of the entire structure, namely the two tube sheets 1 and 2 that are interconnected by the housing, and the tubes 3 that are secured at one end in the tube sheet 1, is now effected. During this thermal treatment, that end of the tubes 3 provided with the tubular extension 5 can move freely within the hole 2a in the tube sheet 2, because this end of the tube 3 is not yet connected to the tube sheet 2. Variations in length d caused by different temperatures therefore do not lead to stresses within the tubes 3 or in the tube sheets 1 and 2. This in particular avoids the introduction of stresses into the previously produced weld seams 6, 8, 9 and 10; such stresses could cause these weld seams to be damaged. The thermal treatment of the entire structure is therefore relatively simple to carry out without difficulty.

After conclusion of the thermal treatment, the situation illustrated in FIG. 1 results. The previously free ends of the tubes 3 are now hydraulically expanded in the vicinity of the tube sheets 2. Thereupon, the previously free ends of the tubes 3 are joined to or placed against the holes 2a of the tube sheet 2, as shown in the right hand portion of FIG. 2; in this embodiment, the holes 2a are also provided with rounded-off recesses. The hydraulic expansion is also effected in the region of the sleeves 7 and the extensions 7a, thus eliminating the gap that previously existed (see FIG. 1) between that portion of the tube 3 that extended out of the tube sheet 2, and the sleeve 7, which is provided with the extension 7a. This elimination of the gap can also be seen from FIG. 2, where the hydraulic expansion zone is designated by the reference letter E. The tubes 3, which are now secured to the tube sheets 1 and 2 at both ends, are subsequently welded to the extension 7a of the associated sleeve 7 in the region of the tubular extension 5. The resulting weld seam 11 does not have to be thermally treated, since not only the tubular extensions 5 but also the extensions 7a are made of a material that can be welded without thermal treatment. Thus, neither the fixing of those tube ends that remain free after the thermal treatment to the tube sheet 2 via hydraulic expansion, nor the subsequent indirect welding of these tube ends to the tube sheet 2 via the sleeves 7, require a subsequent thermal treatment that would lead to stresses within the finished structure. In addition, the freely accessible weld seam 11 can be checked without difficulty before a pressure check of the now finished structure is undertaken.

If a tube 3 is damaged during operation of the heat exchanger produced by the aforementioned method, it is easily possible to close-off this tube 3. For this purpose, a plug can be inserted into the tubular extension 5 and can be welded thereto; this plug is also made of a material that can be welded without thermal treatment. At the other end, the tube opening can be closed-off by a cover of a material that can be welded without thermal treatment; this cover is welded to the plating 4. In both cases, no subsequent thermal treatment is required.

However, repair can be effected not only by closing-off the defective tube 3, but also by inserting a new tube.

This new tube is provided at both ends with a tubular extension 5 of a material that can be welded without thermal treatment, so that the ends of the new tube can be welded, without subsequent thermal treatment, not only to the extension 7a of the sleeve 7, but also to the plating 4. If the weld seam 11 becomes loose or leaks, it is merely necessary to undertake a joint welding repair. Here also it is unnecessary to effect a thermal treatment.

The present invention is, of course, in no way restricted to the specific disclosure of the specification and drawing, but also encompasses any modifications within the scope of the appended claims.

What we claim is:

1. A method of securing tubes between tube sheets of a heat exchanger, with said tube sheets being interconnected via a housing, and with said tubes and/or said tube sheets being made of a steel that has to be annealed, for stress-relieving purposes, after a welding process; said method includes the steps of:

providing said tube sheets with holes for receiving said tubes;

extending the length of at least one end of each of said tubes by welding thereto a tubular piece that is made of a material that can be welded without a subsequent thermal treatment being required;

welding onto the outer surface of at least one of said tube sheets sleeves that respectively extend the length of said holes in that tube sheet, with at least the free, non-welded end of each of said sleeves being made of a material that can be welded without a subsequent thermal treatment being required;

inserting said tubes into said holes of said tube sheets;

welding onto one of said tube sheets one end of each of said tubes if that tube end is not provided with a tubular extension piece, with a tube sheet that is provided with said sleeves remaining non-welded to said tubes;

carrying out a final thermal treatment of said tube and tube sheet structure after all welding steps that require a subsequent thermal treatment are concluded; and indirectly connecting said tubes to those tube sheets that are provided with said sleeves by welding the free, non-welded ends of said tubular extension pieces of said tubes to said sleeves.

2. A method of securing tubes between a first and second tube sheet of a heat exchanger, with said tube sheets being interconnected via a housing, and with said tubes and/or said tube sheets being made of a steel that has to be annealed, for stress-relieving purposes, after a welding process; said method includes the steps of:

providing said tube sheets with holes for receiving said tubes;

extending the length of one end of each of said tubes by welding thereto a tubular piece that is made of a material that can be welded without a subsequent thermal treatment being required;

welding onto the outer surface of said second tube sheet sleeves that respectively extend the length of said holes in said second tube sheet, with at least the free, non-welded end of each of said sleeves being made of a material that can be welded without a subsequent thermal treatment being required;

inserting said tubes into said holes of said tube sheets in such a way that said tubular extension pieces and said sleeves are adjacent to one another;

welding that end of each of said tubes that is not provided with a tubular extension piece onto said first tube sheet;

carrying out a final thermal treatment of said tube and tube sheet structure after all welding steps that require a subsequent thermal treatment are concluded; and indirectly connecting said tubes to said second tube sheet by welding the free, non-welded ends of said tubular extension pieces of said tubes to said free, non-welded end of said sleeves.

3. A method according to claim 2, which, to secure the position of said tubes in said tube sheets, includes, after said step of inserting said tubes into said holes, the additional step of hydraulically expanding said tubes not only in the region of said tube sheets, but also in the region of said tubular extension pieces and said sleeves.

* * * * *